Jan. 15, 1963  M. W. LA RUE, JR  3,073,220
EXPOSURE CONTROL DEVICE FOR A PHOTOGRAPHIC CAMERA
Filed May 29, 1959
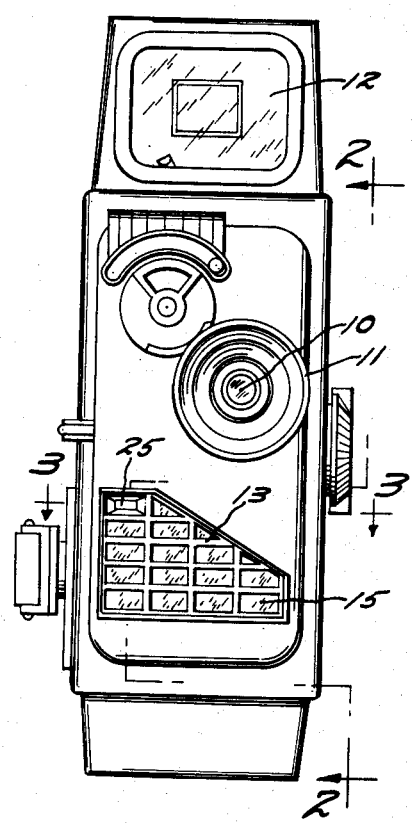
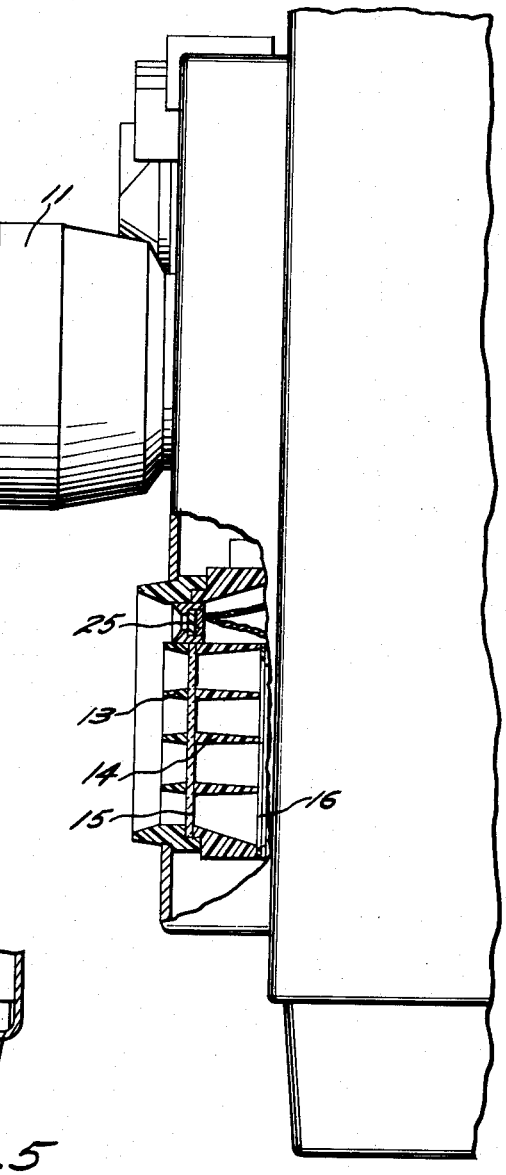
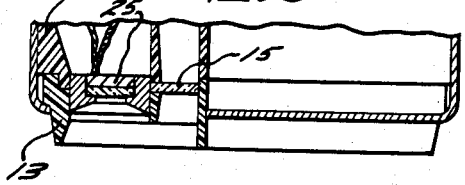
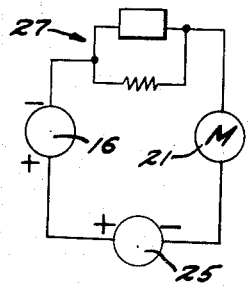
Inventor
Mervin W. La Rue Jr.
By Robert F. Michle Jr.
Atty.

3,073,220
EXPOSURE CONTROL DEVICE FOR A PHOTOGRAPHIC CAMERA

Mervin W. La Rue, Jr., Cuba Township, Lake County, Ill., assignor to Bell & Howell Company, Chicago, Ill., a corporation of Illinois
Filed May 29, 1959, Ser. No. 816,796
3 Claims. (Cl. 95—10)

This invention relates to an exposure control device for a photographic camera and more particularly to a backlighting detector for an automatic exposure control device.

An object of the invention is to provide an exposure control device compensated during backlighting conditions.

Another object of the invention is to provide a camera including an automatic exposure control device having a primary photoelectric cell for actuating the device and secondary photoelectric means positioned to receive greater illumination than the photoelectric cell when the camera is directed in the quadrant of the sun and reducing the output of the primary cell during such backlighting conditions.

Another object of the invention is to provide a photographic camera having an automatic exposure control device including an electric motor controlled by a primary photoelectric cell together with a smaller secondary, backlighting compensating photoelectric cell connected in opposition to the primary cell and having a wider acceptance angle than the primary cell so as to have a greater opposing effect during backlighting conditions. The compensating cell may be of the photovoltaic type connected in series with the primary cell or, as an alternative, the compensating cell may be of the photoresistive type connected in shunt relative to the primary cell.

In the drawings:

FIGURE 1 is a front elevation view of a photographic camera having an automatic exposure control device forming one embodiment of the invention;

FIGURE 2 is an enlarged, partially sectional view taken along line 2—2 of FIGURE 1;

FIGURE 3 is an enlarged, horizontal sectional view taken along line 3—3 of FIGURE 1;

FIGURE 4 is a diagrammatic view of the operating circuit of the automatic exposure control device shown in FIGURE 1; and FIGURE 5 is a diagrammatic view of a modified operating circuit for the automatic exposure control device of FIGURE 1.

Referring now in detail to the drawings, the photographic camera shown therein is of the motion picture type and includes a lens or optical objective 10 having a conventional sun shade 11 to prevent stray light from entering the lens. The camera also has a viewfinder 12 and an automatic exposure control device including grill-like sunshades or grides 13 and 14, a filter or transparent cover 15, and a primary photoelectric cell 16 of the photovoltaic type. The acceptance angle of the cell 16 is determined by the grill-like walls of the shades 13 and 14, the cell being behind both of the shades 13 and 14.

The cell 16 serves to supply operating current to a coil 21 of a galvanometer to turn the coil against the action of a spring (not shown) through an arc more or less proportional to the illumination of the cell 16. The galvanometer serves as a motor which drives an adjustable exposure control mechanism disclosed and claimed in Bagby et al. Patents 2,841,064 and 2,858,754 and assigned to the same assignee as the present application. The automatic exposure control mechanism includes an adjustable stop or diaphragm which is driven by the coil 21 to adjust the effective aperture of the lens 10 generally inversely relative to the illumination of the scene to be photographed. In general, the exposure control device causes the lens aperture to become smaller during conditions in which the scene to be photographed is highly illuminated and causes the aperture to become larger when the illumination of the scene is low. Except during backlighting conditions which are present when the camera is pointed in the quadrant of the sun or other apparently small brilliant light source, the lens aperture becomes smaller in proportion to the illumination of the scene, which is measured by the illumination of the cell 16, with the intent of applying a constant quantity of light upon the photographic film for each exposure. In order to have proper exposure during backlighting conditions where the object to be photographed usually is much less illuminated than the total scene or field of the lens and the cell 16, the output current of the cell 16 is reduced by a photoresistor 26 as illustrated in FIGURE 5 or by a small photoelectric cell 25 of the photovoltaic type as illustrated in FIGURE 4. The compensating cell 25 is connected in series with the coil 21 and a temperature-compensating thermistor-resistor network 27, and since the area of the cell 25 is a small fraction of the area of the cell 16, the cell 25 has little effect during low illumination conditions of the scene to be photographed. However, during backlighting, the cell 25 due to its wide acceptance angle receives direct rays of the sun and is highly activated to disproportionately oppose the cell 16. The size of the cell 25 relative to that of the cell 16 should be small enough to have little effect on the cell 16 in photographing un-backlighted scenes while large enough and with a large enough acceptance angle to oppose the cell 16 sufficiently to cause the lens aperture to increase its area by perhaps four times as much as it would be if the cell 16 were unopposed. In one constructed embodiment of the invention, the exposed area of cell 25 was about 1% of that of the cell 16 and the angle of acceptance of the cell 25 as determined by its position in the shade 13 was about 150° and normally centered on a horizontal axis. The vertical acceptance angle of each portion of the cell 16 was about 40° while the horizontal acceptance angle of each portion of the cell was somewhat greater than 40°, being about 80° in one instance, and was centered on a horizontal axis parallel to the central axis of the acceptance angle of the cell 25. The unopposed current output of the cell 16 during backlighting was about 25 micro-amperes, and that of the cell 25 was about 7 micro-amperes while in un-backlighted conditions, the opposing current of the cell 25 dropped to 7/32 micro-ampere while the current of the cell 16 remained the same. The cell 25 is held in a molded plastic mount 28 fixed securely in or a part of one of the grill openings in the shade 13.

In the circuit shown in FIGURE 5, the photoresistor 26 is connected in shunt with the coil 21 and network 27. The acceptance angle and proportion of the exposed area of the photoresistor 26 to that of the cell 16 are generally similar to those of the cell 25 in the circuit of FIGURE 4, and during unbacklighted conditions the photoresistor has a high resistance relative to the load resistance comprising the network 27 and coil 21 so very little current is shunted from the coil 21. However, during backlighting, the light on the photoresistor 26 drops the resistance thereof to such a value that current to the coil is reduced sufficiently that the lens aperture is caused to open a greater amount than it would be in the absence of the photoresistor 26 from the circuit.

The effect of the elements 25 and 26 is to compensate for backlighting while having negligible effect during unbacklighted conditions.

While the invention is thus described, it is not wished to be limited to the precise details described, as changes may be readily made without departing from the spirit of the invention.

What is claimed is:

1. In a camera, an objective, automatic exposure control means including a primary photoelectric cell for actuating the control means, means for shading said primary photoelectric cell to form a predetermined acceptance angle of the cell, a secondary photoelectric cell of relatively small area compared to the primary photoelectric cell and electrically opposing the primary cell to reduce the effect of said primary cell on the control means, said secondary photoelectric cell being directed in substantially the same direction as that of the primary photoelectric cell and having an acceptance angle much greater than that of the primary cell so that the secondary cell receives a much greater amount of direct sunlight or other illuminant than that received by the primary photoelectric cell and accordingly has a relatively great effect in reducing the effect of the primary cell on the control means when the camera is directed in the quadrant of the sun or other illuminant so as to receive backlighting on the secondary cell but not on the primary cell, said secondary cell having an effect on the control means approaching zero due to its small area relative to the primary cell when the camera is directed so that the main source of light is within the field of the acceptance angle of the primary cell.

2. In a camera including a galvanometer and a main photocell for controlling the galvanometer, forwardly facing grid means at the front of the camera and in front of the main photocell to define a predetermined field of acceptance for the main photocell, a compensating photocell facing in the same direction as the grid means, and in a position having a substantially larger field of acceptance than and overlapping that of the main photocell, said compensating photocell being of an area a small fraction of the area of the main photocell and an electrical circuit means connecting the compensating photocell to the main photocell and the galvanometer so as to substantially reduce power supplied to the galvanometer when said compensating photocell is receiving light directly from a source outside the predetermined field of the main photocell, said compensating photocell approaching zero effect due to its small size relative to the main photocell when the principal source of light is within the fields of each of the photocells.

3. In a camera including a galvanometer, a grid having a plurality of cells and positioned at the front of the camera and facing forwardly, a compensating photocell mounted in a position facing in substantially the same direction as the grid and having a predetermined field of acceptance, a main photocell having an area much greater than that of the compensating photocell and mounted at the rear of the grid in a position having a field of acceptance inside of and substantially smaller than the field of the compensating photocell, and circuit means connecting the compensating photocell and the main photocell in parallel to the galvanometer in such polarities that the compensating photocell reduces the effect of the main photocell on the galvanometer when said compensating photocell is receiving light directly from a source outside the predetermined field of the main photocell, said compensating photocell approaching zero effect due to its small size relative to the main photocell when the principal source of light is within the field of each of the photocells.

References Cited in the file of this patent

UNITED STATES PATENTS

| Re. 20,823 | Goodwin | Aug. 9, 1938 |
| --- | --- | --- |
|  | (Original 2,032,010) |  |
| 2,378,433 | Riszdorfer | June 19, 1945 |
| 2,503,768 | Riszdorfer | Apr. 11, 1950 |
| 2,584,440 | Fogle | Feb. 5, 1952 |
| 2,841,064 | Bagby | July 1, 1958 |
| 2,858,754 | Bagby | Nov. 4, 1958 |